No. 688,626. Patented Dec. 10, 1901.
C. P. A. FRIBERG.
DIGGER HEAD FOR STUBBLE DIGGERS.
(Application filed Aug. 5, 1901.)
(No Model.) 2 Sheets—Sheet 1.
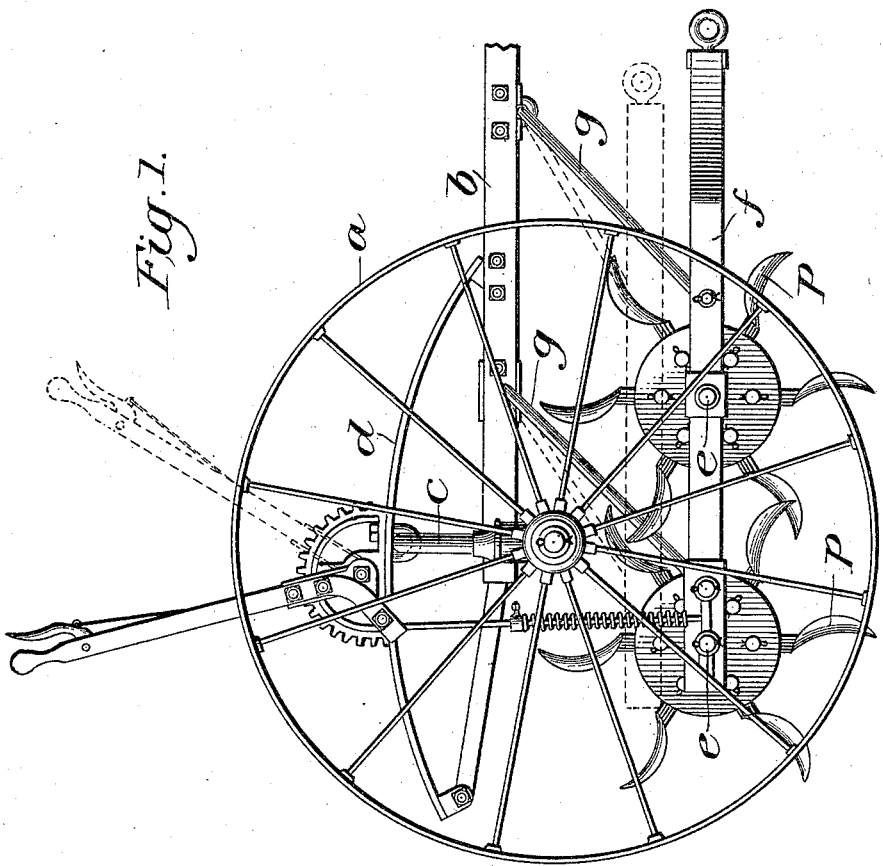

No. 688,626. Patented Dec. 10, 1901.
C. P. A. FRIBERG.
DIGGER HEAD FOR STUBBLE DIGGERS.
(Application filed Aug. 5, 1901.)
(No Model.) 2 Sheets—Sheet 2.
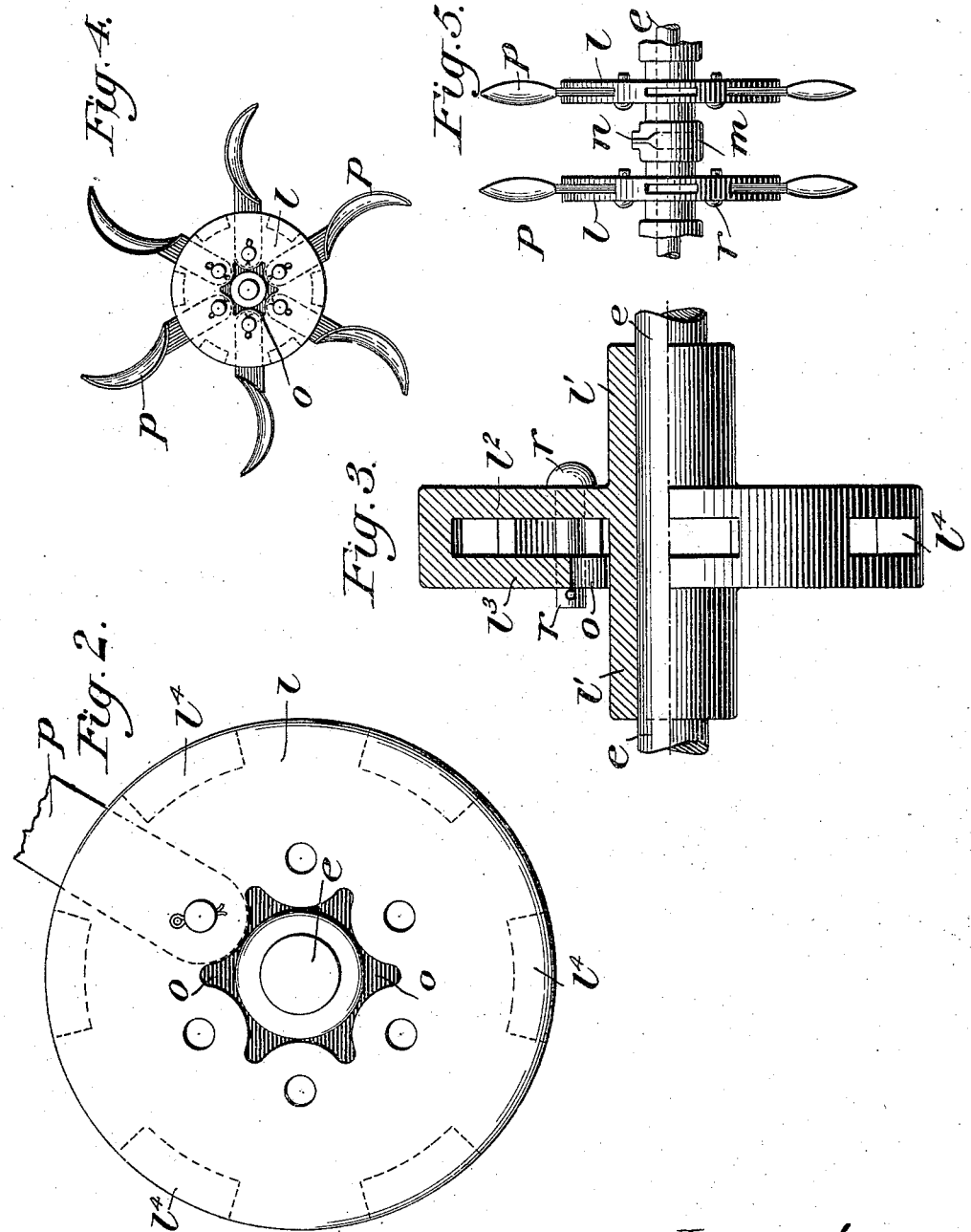

UNITED STATES PATENT OFFICE.

CHARLES P. A. FRIBERG, OF MOLINE, ILLINOIS.

DIGGER-HEAD FOR STUBBLE-DIGGERS.

SPECIFICATION forming part of Letters Patent No. 688,626, dated December 10, 1901.

Original application filed December 24, 1900, Serial No. 40,969. Divided and this application filed August 5, 1901. Serial No. 70,931. (No model.)

*To all whom it may concern:*

Be it known that I, CHARLES P. A. FRIBERG, a citizen of the United States, residing at Moline, county of Rock Island, State of Illinois, have invented certain new and useful Improvements in Digger-Heads for Stubble-Diggers; and I do hereby declare the following to be a full, clear, and exact description of the invention, such as will enable others skilled in the art to which it appertains to make and use the same.

The invention herein described relates to the construction of the revolving tooth-carrying digger-heads employed in the machine forming the subject of my prior application, filed December 24, 1900, Serial No. 40,969, for stubble-diggers, of which application this is a division.

The accompanying drawings, forming part of this specification, illustrate this construction.

In the drawings, Figure 1 is a side view of the entire machine, showing the digger-heads in working position. Fig. 2 is a side elevation of one of the heads detached. Fig. 3 is a central cross-section of the head shown in Fig. 2. Fig. 4 is a side view, and Fig. 5 an edge view showing the manner of spacing the teeth.

Referring first to Fig. 1, $a$ denotes the wheels, $b$ the main frame, $c$ the arched axle, and $d$ the seat-support, of the machine. The digger-heads are journaled on cross-shafts $e\ e$, mounted on a supplemental frame $f$, that is suspended from the main frame by means of pairs of parallel links $g\ g$, that are pivotally connected to the two frames at opposite ends.

The team is hitched to the supplemental frame at $h$, and a hand-lever $i$ is mounted in convenient proximity to the driver's seat and is connected by a link $j$ to the digger-carrying frame at the rear. A spring $k$, that is coiled around the rod $j$, presses the supplemental frame at the rear and coöperates with the draft of the team and the thrust of the links to hold the digger-heads down to their work.

As thus far described the machine is claimed in the application above referred to. The present application relates to the digger-heads solely, which will now be described.

Revolving heads having digger-teeth are not new in this class of machines; but considerable difficulty has been experienced heretofore, owing principally to the clogging of the heads with dirt and trash and the failure of the teeth to work properly. The present invention has therefore been devised with a view to make the heads as nearly as possible self-cleaning, also to lighten up the construction of the heads and insure the free and easy working of the teeth.

Referring now to the second sheet of the drawings, the digger-heads are denoted by $l$. They are loosely journaled, as before described, on the through-shaft $e$ and are spaced apart thereon by thimbles $m$, provided with suitable oil-ducts $n$. The heads are made in the form of circular disks and are provided with hubs $l'$ at the sides, that are sufficiently elongated to give the disks the proper spacing on their shafts. These heads are cast in a single piece with their hubs, and the circular portions, to which the teeth are connected, are made in the form of two flat disks, one of which, $l^2$, projects diametrically from the hub portion and the other of which, $l^3$, is parallel with the former and is connected thereto and supported entirely at the outer edges by means of lugs $l^4$. At its inner edge the disk $l^3$ is not connected to the hub portion or to the other disk, but is cut away, as best shown at $o$ in Figs. 2, 3, and 4, so as to provide for the free escape of the dirt and trash that unavoidably finds its way into the hollow interior of the head.

The digger-teeth are denoted by $p$. They have curved spade-like points and plain flat shanks. The shanks are passed into the hollow space between the disks forming the head and are pivoted there by means of through-pins $r$, so as to have a limited movement or play around the axis of the head.

As before described, the two disks that form the head are connected together only at their periphery, lugs $l^4$ being formed at regular distances apart to connect them. The pins on which the digger-teeth are pivoted are set opposite the spaces between these lugs, so that the teeth are free to play between the lugs, which form stops against which the teeth strike on both sides. No great amount of play is required between these stops; but a limited pivotal movement is desirable to insure the proper action of the teeth themselves, as well as to assist in freeing the interior of the heads.

The construction being as thus described, it will be seen that each head is a rigid integral structure all cast in one piece. The space between the disks forming the heads is cored out in a manner well understood in the art of founding, and in this way the heads are made self-cleaning and the clogging of the same and the teeth is prevented.

Having thus described my invention, what I claim, and desire to secure by Letters Patent, is—

1. A toothed head for wheeled diggers, the same consisting of a pair of disks suitably spaced apart and having digger-teeth loosely pivoted between them, said disks being integral with each other and all cast in one piece.

2. A toothed head for wheeled diggers, the same consisting of a pair of disks suitably spaced apart and having digger-teeth loosely pivoted between them, said disks being provided with a hub whereby they are adapted to be supported upon their shaft, and being connected together near their periphery by lugs forming stops to limit the movement of the teeth, and having a self-cleaning opening at the center near the hub.

3. A toothed head for wheeled diggers, the same consisting of disks $l^2$, $l^3$, suitably spaced apart, and having digger-teeth loosely pivoted between them, said disks being connected at their periphery by lugs $l^4$, forming stops to limit the play of the teeth, and one of said disks being cut away near the hub so as to form the opening $o$ for the escape of dirt, &c., from the interior of the head.

In testimony whereof I affix my signature in presence of two witnesses.

CHARLES P. A. FRIBERG.

Witnesses:
E. D. GREEDY,
ROBERT SCHMIDT.